United States Patent [19]
Lai et al.

[11] 3,989,024
[45] Nov. 2, 1976

[54] CONSTANT ENERGY ELECTRONIC IGNITION SYSTEM

[75] Inventors: Chi Sun Lai, Lake Zurich; Zbynek Antonin Capurka, Glen Ellyn, both of Ill.

[73] Assignee: Motorola, Inc., Schaumburg, Ill.

[22] Filed: Mar. 7, 1975

[21] Appl. No.: 556,235

[52] U.S. Cl. .................... 123/148 E; 123/117 R
[51] Int. Cl.² ........................................ F02P 1/00
[58] Field of Search.. 123/148 MC, 148 E, 146.5 A, 123/117 R

[56] References Cited
UNITED STATES PATENTS

| | | | |
|---|---|---|---|
| 3,592,178 | 7/1971 | Schiff | 123/148 E |
| 3,738,339 | 6/1973 | Huntzinger et al. | 123/117 R |
| 3,757,755 | 9/1973 | Carner | 123/117 R |
| 3,809,029 | 5/1974 | Wakamatsu et al. | 123/117 R |
| 3,811,420 | 5/1974 | Vogel | 123/146.5 A |
| 3,853,103 | 12/1974 | Wahl et al. | 123/146.5 A |
| 3,867,916 | 2/1975 | Bigalke | 123/117 R |
| 3,888,220 | 6/1975 | Bigalke et al. | 123/117 R |

*Primary Examiner*—Charles J. Myhre
*Assistant Examiner*—Paul Devinsky
*Attorney, Agent, or Firm*—Donald J. Lisa; James W. Gillman

[57] ABSTRACT

A first sensor couples to an internal combustion engine and generates a first set of pulses suitable for ignition firing. A second sensor operates in synchronism to the first sensor producing a second set of multiple pulses, during the interval between a first set of pulses, whose occurrence corresponds to specified angles of engine revolution and whose time duration is inversely related to engine RPM. The second pulse set is processed through a digital-to-analog converter having a staircase output voltage which is representative of instantaneous engine position.

The second pulse set is further processed through an integrator, modified to produce an output approximating an inverse, or hyperbolic, functional relationship to the input, whereby output pulses are generated whose peak amplitude is representative of instantaneous engine speed, i.e. RPM.

Comparator circuitry produces a trigger signal corresponding to a predetermined relationship between the positive voltage signal and speed pulses. The trigger signal activates a switch which initiates ignition coil dwell time such that the time interval from initiation of dwell time for recharging the coil to the next ignition firing is constant over substantially the entire range of operating RPM's thereby always recharging the coil to the same energy level between firings.

10 Claims, 3 Drawing Figures

CONSTANT ENERGY ELECTRONIC IGNITION SYSTEM

BACKGROUND OF THE INVENTION

This invention generally relates to fully electronic ignition systems for internal combustion engines, and more particularly to means for obtaining a constant dwell time in such systems.

Conventional ignition systems store energy in the ignition coil which, upon ignition firing, creates a voltage suitable for firing a spark plug. Between times of firing, energy must be restored to the coil. Here a compromise must be made. If energy is pumped into the coil at all times except firing, power consumption is high. If, however, insufficient energy is restored, the spark energy decreases causing inefficiency in engine operation.

The problem is a function of engine RPM. At low RPM there is a relatively long time between firing, conversely, at high RPM, the coil must be recharged quickly to prepare for the next firing.

Conventional distributors use breaker points to determine the amount of time the coil is recharged. The points are simply a pair of electrical contacts — one of which is stationary and the other is in a position to ride on a cam driven off of the engine. When the points are closed the coil is energized. The duration of time that the points are closed is defined as dwell time. Similarly, the angle on the cam through which the points are closed is defined as dwell angle. Conventional systems fix the dwell angle and, in so doing, do not adequately satisfy the tradeoff between coil efficiency and engine efficiency, there being a rapid falloff in the energy level obtained in the coil as RPM increases. Ideally, the ignition energy level should remain constant over the active range of engine RPM. The only variable in the equation for ignition energy which is conveniently alterable is the time during which energy is being restored to the coil. Thus, the way to maintain constant energy is to vary dwell angle to provide a constant dwell time.

SUMMARY OF THE INVENTION

It is an object of this invention, therefore, to provide an ignition system which includes means for altering ignition dwell angle in order to provide a constant dwell time over the normal operating speed of the engine.

A first sensor couples to the engine and produces output trigger pulses suitable for ignition firing. A second sensor, also coupled to the engine, produces output position pulses at a frequency representative of the magnitude of engin RPM, and of a width inversely related to RPM. The position pulses are processed in a first circuit means whereby an output signal is produced which is representative of engine position. The first circuit means resets to its initial state prior to the occurrence of the first position pulse following a trigger pulse, thereby in preparation for the next cycle.

A second circuit processes the position pulses producing an output representative of engine RPM. Since the time duration of the position pulses is inversely related to engine RPM, the second circuit means includes a modified integrator which produces an output signal whose peak approximates the inverse of the time duration of the position pulses, and thus is representative of engine RPM.

The outputs from the first and second circuits are fed to a comparator which produces a trigger signal in response to a predetermined relationship between the two outputs. The trigger signal activates a switch which in turn initiates dwell time, said initiation being timed to provide a constant dwell time for recharging the coil prior to the next ignition firing. The switch also fires the ignition in synchronism to a generated ignition pulse.

The foregoing and other aspects of the invention will be understood more fully from the following detailed description of an illustrative embodiment of the present invention in conjunction with the accompanying drawings.

DETAILED DESCRIPTION OF A PREFERRED EMBODIMENT OF THE INVENTION

Figure 1:
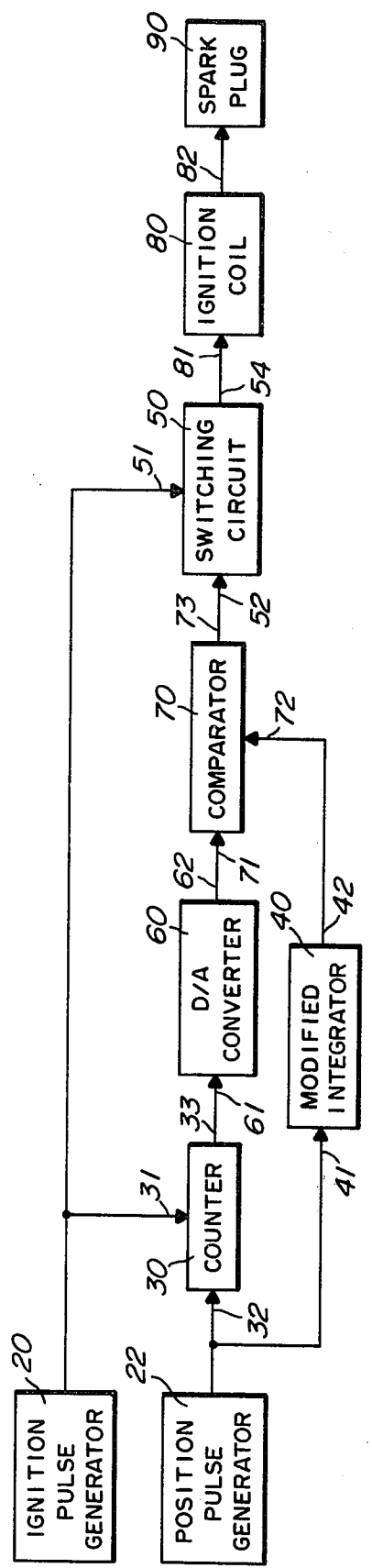
FIG. 1 illustrates, in block diagram form, the component parts of a preferred embodiment of a system according to the present invention.

An ignition pulse generator 20 is comprised of a sensor which couples to the engine and produces output pulses suitable for the timely firing of the ignition system. Also coupled to the engine is a position pulse generator 22 which produces output pulses at a rate representative of the magnitude of engine RPM. The position pulses are of a fixed amplitude and have a time duration which is inversely proportional to engine RPM. Furthermore, the position pulses are synchronized with the ignition pulses whereby a plurality of position pulses are generated during the interval between ignition pulses, all position pulses being equidistantly spaced at a constant RPM. Both ignition and pulse generators may be comprised of sensors well known in the art. For example, as is fully described in U.S. Pat. No. 3,592,178 to Schiff, timing markers may be located within circular tracks on a disc. The disc is mounted to the distributor shaft, in alignment, such that the marks corresponding to ignition pulses are opposite a trigger sensor at the desired time of spark plug firing, whereas the marks corresponding to engine position are opposite a position sensor at given angles of engine rotation. The pickup sensor may be comprised of photosensitive transistors which are positioned in alignment with each track for generating pulses indicative of the passage of a marker. In the alternative, the generators may be comprised of standard magnetic reluctance type pickups which are coupled to a shaft driven off of the engine. Basically, such systems are comprised of a rotating disc within which are located magnetic elements. The axis of a pickup coil is aligned to be in magnetic circuit orientation with the rotating magnetic elements. The incidence of each magnetic element aligning itself with the axis of the electromagnetic coil induces a voltage in the coil suitable for producing an output pulse at the coil extremes.

Either type sensor generator is adaptable to a device according to the instant application. Particularly, position pulses are generated in a predetermined synchronous relation to engine position and the ignition pulse interval. Eight position pulses are generated in the interval between the ignition pulses, each position pulse being generated at a time representative of a fixed instantaneous angle of rotation of the engine. Furthermore, the time duration of each position pulse is inversely proportional to the rate of engine RPM. Thus, at low engine RPM, the timing markers on the photosystem or the magnetic elements in the reluctance system pass their respective pickups at a lower rate thereby providing extended output pulses.

The ignition pulse generator output is coupled both to a reset input 31 of a counter 30, and a fire signal input 51 of a switching circuit 50. The output from the position pulse generator 22 couples to an input 32 of the counter and to an input 41 of a modified integrator 40.

The counter output 33 couples to an input 61 of a digital to analog converter 60 whose output 62 couples to one of the inputs 71 of a comparator 70. The remaining comparator input 72 is coupled to the output 42 of the modified integrator. The comparator's output 73 connects to the input terminal 52 of the switching circuit. The switching circuit output 54 connects to the input 81 of an ignition coil 80. Finally, the output 82 of the ignition coil 80 drives a spark plug 90.

Figure 2:
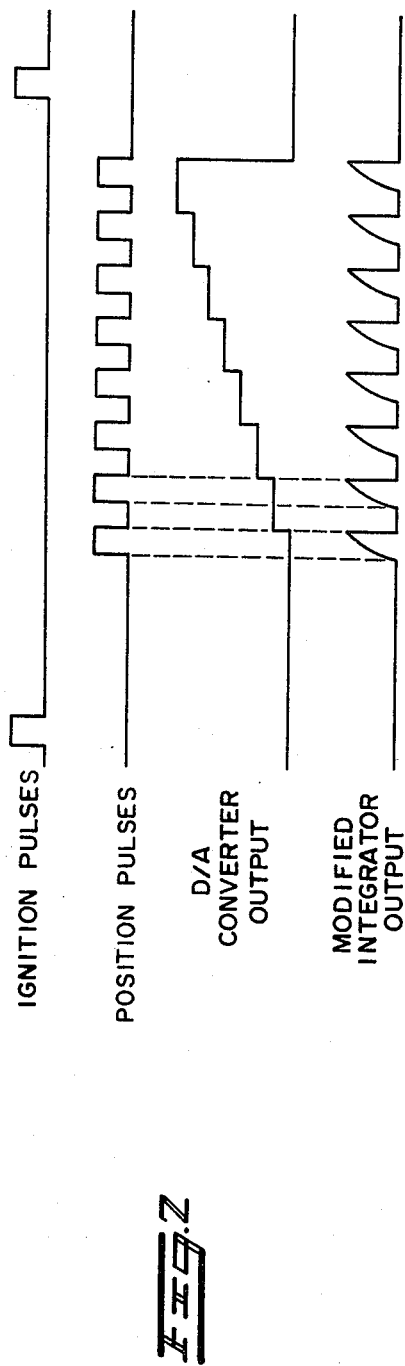
FIG. 2 illustrates representative waveforms found at various points in the system as shown in FIG. 1.

System operation is understood with periodic reference to FIG. 2. Assuming the system is in the beginning of a cycle, i.e. immediately following an ignition pulse, a sequence of position pulses is applied both to the counter 30 and the modified integrator 40. The counter 30 produces at its output 33 a digital signal coded to denote the number of input counted pulses. The digital output from the counter is applied to a digital to analog converter 60 which, in turn, produces an increasing staircase analog output (shown in FIG. 2) whose instantaneous value approximates the instantaneous angle of revolution of the engine. This increasing staircase, representative of engine position, is fed to one input 71 of the comparator 70.

The position pulses are similarly fed to the modified integrator, which produces a series of output pulses (shown in FIG. 2) whose height is representative of instantaneous engine RPM. These pulses are in turn fed to the comparator's second input 72. Thus, the comparator has inputs corresponding to both instantaneous engine position, and speed. The comparator 70 produces a trigger pulse at its output 73 corresponding to a predetermined relative relation between its two inputs. A comparison of signals generated by the counter in conjunction with the digital to analog converter, and the modified integrator, is in a directed manner such that a trigger signal produced by the comparator fires the switching circuitry 50 at a time suitable to produce a fixed dwell time at the given engine RPM. The trigger signal to the input of the switching circuit 52 in turn initiates dwell time by applying power to the ignition coil 80. A subsequent ignition pulse from the generator 20 fires the switching circuit thus causing the ignition coil to fire the spark plug 90 in a manner well known in the art. It should be understood that maintenance of a fixed dwell time during normal engine RPM requires continuous monitoring both of engine position and of engine RPM. As RPM increases, the time between ignition pulses decreases, and the time of instituting dwell must advance, i.e. dwell angle must increase.

The integrator 40 is modified to produce an output representative of engine RPM. As engine RPM decreases, the time duration of the position pulses increases, and a standard integrator would produce an output pulse whose amplitude would be directly related to the time duration of the input pulses. Such an output is the reciprocal of the desired quantity. Thus, the integrator is modified to produce an output inversely related to the input, that is, the output is the hyperbolic transfer of the input. The scaled hyperbolic function may be approximated by an exponential transfer function, e.g. a standard RC circuit. The modified integrator, according to the invention, is comprised of a resistance, a capacitance, a voltage source, and a switch. The resistor and capacitor are connected in series across the output terminals of the voltage source. The switch connects across the capacitor whereby the capacitor is shorted other than at times of a received input position pulse. When a position pulse is received, the switch opens, allowing the capacitor to charge through the resistor to the value of the voltage source. The rate at which the voltage across the capacitance increases is an exponential chosen to approximate the hyperbolic function. As the duration of the position pulses increase, corresponding to decreased engine RPM, the greater the charge on the capacitor prior to the switch closing upon completion of a position pulse. Thus, as engine RPM decreases the peak amplitude of the modified integrator output increases and the predetermined relationship between the first input to the comparator 71 and the second input 72 occurs later in the ignition cycle, thus decreasing dwell angle to maintain a constant dwell time. Conversely, should engine RPM increase, the peak value of the integrator output correspondingly decreases, allowing an earlier comparator trigger output in the cycle maintaining the constant dwell time.

At very low RPM, such as at cranking, and at very high RPM, it is desirable to return the system to a constant dwell angle. This is accomplished by careful synchronism of the position pulses to the ignition pulses. The first position pulse is located at a lag with respect to the ignition pulse such that, at higher RPM, the system cannot initiate dwell time until a fixed interval into the cycle. This interval is chosen to represent a certain dwell angle. The final position pulse is at a predetermined lead with respect to a subsequent ignition pulse such that the initiation of dwell time must occur at a certain minimum dwell angle.

Figure 3:
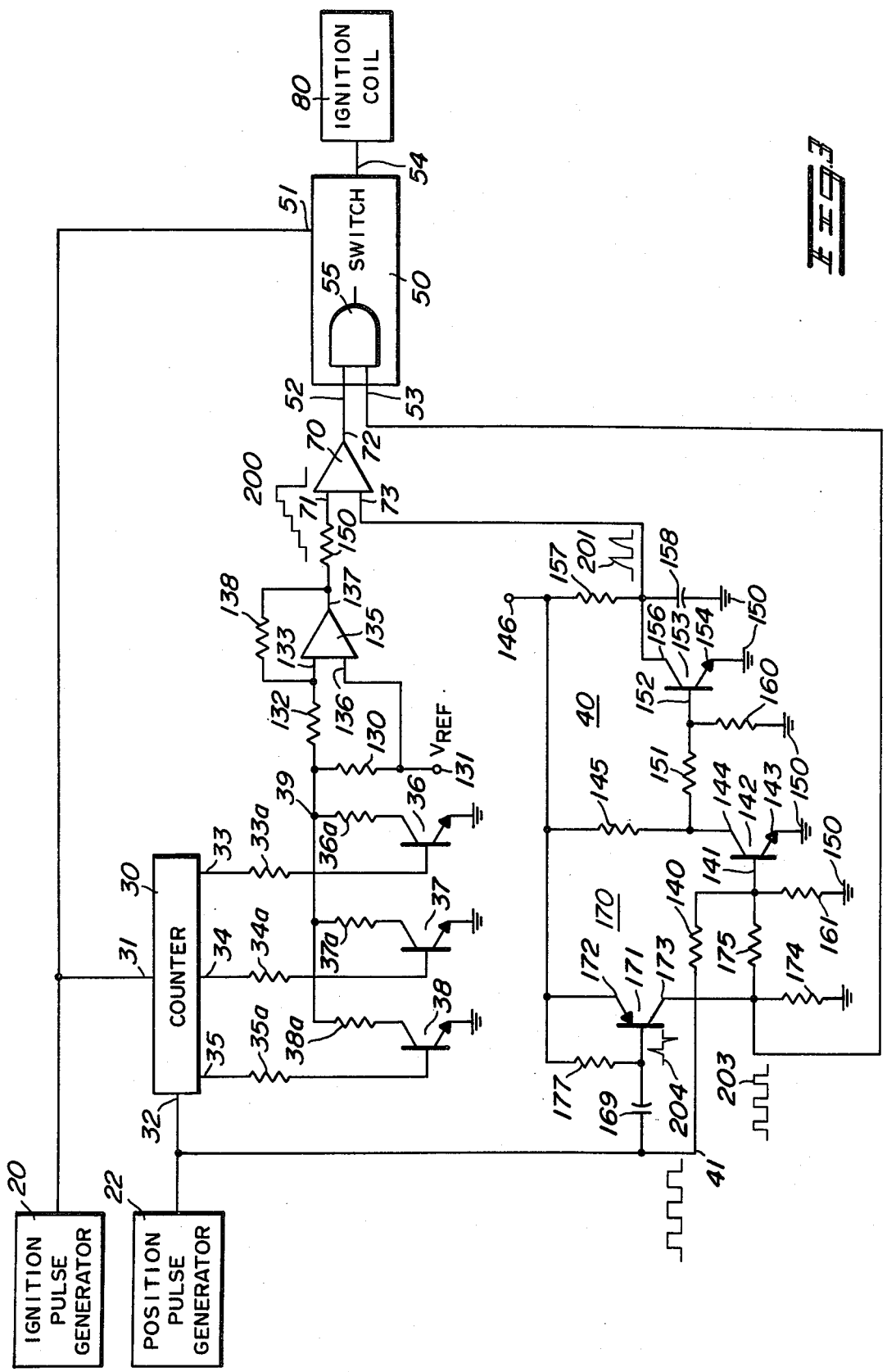
FIG. 3 is a detailed schematic of a preferred embodiment of the invention.

A full schematic diagram of the preferred embodiment of the invention is given in FIG. 3. The ignition pulse generator 20 is shown connected to the reset input 31 of a counter 30 and to the firing input 51 of a switch 50. The output of the position pulse generator 22 is shown connected to the input 32 of the counter 30 and to the input 41 of the modified integrator represented generally at 40. The counter is of standard design having a three place binary coded decimal output. The first output line 33 represents the first place of a binary coded decimal number, the second output 34 represents the second place and the third output 35 represents the third binary coded decimal output place. Thus, a first pulse at the counter input 32 causes the first output line 33 to go high. A subsequent pulse cause the second output line to go high, and so forth in the well known manner for binary coded decimal counters. As the counter is provided with only three output places, the eighth counted pulse returns the counter to low states at all outputs. Each counter output connects through a limiting resistor 33a-34a-35a, to the base of an NPN transistor 36-38 respectively. The emitter of each transistor 36-38 is connected to reference or ground potential. The collector of the transistor is coupled through a specified valued resistor 36a-38a to a common node 39. The common node connects through a divider resistor 130 to a reference voltage 131. The common node also connects through input resistor 132 to the inverting input 133 of an amplifier 135. A non-inverting input 136 of amplifier 135 connects to the reference voltage 131. The output 137 of amplifier 135 is coupled through a feedback resistor 138 to the inverting input 133. Output 137 also couples through a series resistor 150 to the inverting input 71 of the comparator 70. Comparator output 72 connects to the trigger input terminal 52 of the switch 50. The output of the switch 54 connects to the ignition coil 80.

The integrator input terminal 41 couples through a resistor 140 to the base 141 of an NPN transistor 142. Transistor 142 has its emitter 143 coupled to ground potential 150 and its collector 144 coupled through a load resistor 145 to a bias voltage 146. Collector 144 also connects through a resistor 151 to the base 152 of a second NPN transistor 153. Transistor 153 has its emitter 154 connected to ground potential 150 and its collector 156 connected through timing resistor 157 to the bias supply 146. The collector 156 also is coupled to ground potential 150 through timing capacitor 158. Base 152 of transistor 153 is connected through a divider resistor 160 to ground potential 150, similarly the base 141 of the first transistor 142 connects to ground potential 150 through a divider resistor 161. Also connected to the integrator input terminal 41 is a pulse extender circuit 170. The extender circuit is comprised of a DC blocking capacitor 169 which couples from the integrator input terminal 41 to the base of a PNP transistor 171. Transistor 171 has its emitter 172 connected to the bias potential 146 and its collector coupled first through a load resistor 174 to ground potential 150 and second through a resistor 175 to the base 141 of transistor 142. A bias resistor 177 connects between emitter terminal 172 and the base of transistor 171. The output from the extender circuit taken at the collector terminal 173 couples to the second input 53 of the switch 50.

CIRCUIT OPERATION

At turn-on the counter outputs 33-35 are all in the zero, or low state. As subsequent position pulses are received from the generator 22 sequential outputs make the transition to the active state sequentially activating transistors 36-38. For example, the first position pulse activates the first binary coded decimal output 33 to a high state driving transistor 36 to saturation. This creates a resultant voltage at common node 39 which is a function of the reference voltage 131, dropping resistor 130 and collector resistor 36a. As subsequent position pulses are received by the counter 30 corresponding transistors 36-38 are driven to saturation causing a resultant voltage at common node 39. Collector resistors 36a-38a are selected such that the voltage at node 39 will subsequently decrease by a given amount for each received position pulse. The voltage at node 39 is inverted and amplified by amplifier 135 producing a staircase output as is shown at 200. Thus, the transistors 36-38 and their associated resistors in combination with amplifier 135 act as a digital to analog converter transforming the position pulses into an analog staircase output which is representative of engine position. The position pulse generator is designed to create eight position pulses between ignition pulses. Thus, the eighth position pulse to the counter resets the counter to zero output states on all BCD lines. To assure counter 30 is reset to the zero state at the end of one cycle, the counter is also fed an ignition pulse at its reset input 31 thus forcing the counter to assume the zero output state.

With no input pulses to the integrator, transistor 142 is biased to an off state through resistor 161. Thus collector 144 is at a high voltage turning on transistor 153 and maintaining the voltage at timing capacitor 158 to a near ground potential. When a position pulse appears at the integrator input 141 transistor 142 is driven to an on state, its collector 144 approaches ground potential and transistor 153 is biased to an off position. This allows timing capacitor 158 to charge through timing resistor 157 to the predetermined bias voltage 146. The rate of rise of voltage on capacitor 158, and thus its peak value during the period of a position pulse, is dependent upon the value of bias voltage 146, and the product of the resistance of timing resistor 157 and the capacitance of timing capacitor 158. This rate of rise is given as an exponential function whereby the critical circuit values are preselected to approximate a portion of the hyperbolic function. In this manner, an output representative of the inverse of the time duration of the position pulses is created. Thus, the output is representative of the desired quantity, i.e. engine speed.

The representative integrator signal output containing a series of exponentially determined pulses is shown at 201. These pulses are coupled to the non-inverting input 73 of comparator 70. It is seen that the comparator assumes a high output when the instantaneous value of the speed pulses 201 exceeds the instantaneous value of the staircase voltage 200. Otherwise the comparator output assumes a low state. The value of the reference voltage 131, as well as the incremental voltage steps of the staircase waveform 200 are selected to match the peak value created across the timing capacitor such that the instant of instantaneous staircase voltage exceeding peak speed voltage corresponds to that engine angular position which corresponds to a constant dwell time at the instantaneous engine RPM.

The pulse extender circuitry 170 assures that a trigger pulse is generated only when the comparator is comparing peak speed voltage to analog position voltage. The position pulses are differentiated by capacitor 169 and resistor 177 whereby transistor 171 has spike voltages, indicated at 204, applied to its base. The negative spike pulse drives transistor 171 into conduction whereby a very short duration output pulse is generated at its collector 173. These incremental time pulses are synchronous to the conclusion of the position pulses. Transistor 142 acts to sum the position pulses and the extender pulses whereby the output at collector 144 is equivalent to the sum of the two. Therefore, the modified integrator 40 acts for a slightly longer duration than the duration of the position pulse itself. Also, the extended pulses 203 are applied to the second input 53 of switch 50. Internally switch 50 contains a gate 55, having two inputs, one the output of the comparator 72 and the other the extended pulses. The gate acts to produce an output only during the simultaneous occurrance of a high input at 53 and a low input at 52. A high input at 53 corresponds to an extended pulse and a low input at 53 corresponds to the staircase waveform 200 exceeding the value of the peak voltage pulse 201. Thus, the pulse extender circuitry 170 in conjunction with gate 155 cause an output to be created only when the instantaneous value of the engine position voltage exceeds the peak value of engine speed pulses. The resultant output pulse triggers the switch 50 which in turn initiates dwell time by charging the coil. When the switch 50 receives an ignition pulse at its firing input 51 the switch causes the coil 80 to fire thereby firing the ignition.

A significant feature of the invention is its instantaneous response to changing RPM. Between each ignition firing engine speed is compared to engine position up to eight times. Thus a change in RPM is almost immediately reflected in the change in the peak value of the speed voltage 201 which effectuates an immediate change in dwell angle in an attempt to maintain a constant dwell time. While eight position pulses per cycle were chosen in a preferred embodiment, if the number of position pulses per cycle were increased the system would have quicker response to instantaneous RPM changes.

The preferred embodiment of the invention was designed to provide a constant dwell time of 3.33 milliseconds over the engine RPM range of 375 to 3,000 RPM. At low speeds, such as cranking, the staircase waveform never exceeds the peak value of the speed waveform. However, the final position pulse is located in relation to the subsequent ignition pulse such that the comparator output produces a trigger pulse to the switch for a constant duty cycle of 8.3% of the total ignition cycle. At RPM's exceeding 3,000 RPM the initial position pulse is in a predetermined relation to the ignition pulse such that the system cannot institute dwell time for a duty cycle greater than 66.7%.

The following component values, when used in the circuit of FIG. 3, produce the designed constant dwell ignition according to the instant invention.

| Resistance, capacitance, voltage | | | |
|---|---|---|---|
| R 33a–35a | 10K Ohm | R 138 | 10K Ohm |
| R 36a | 4K Ohm | R 150 | 10K Ohm |
| R 37a | 2K Ohm | R 177 | 2K2 Ohm |
| R 38a | 1K Ohm | R 174 | 470 Ohm |
| R 130 | 100 Ohm | R 140 | 10K Ohm |
| R 132 | 2K2 Ohm | R 175 | 10K Ohm |
| | | R 177 | 2K2 Ohm |
| Timing resistor | | Reference Voltage | |
| R 157 | 4K7 Ohm | 131 | ~3.0 volts |
| Timing capacitor | | | |
| C 158 | .068uF | C 169 | .027uF |
| Bias Voltage | | | |
| 146 | +5 volts | | |

While a preferred embodiment of the invention has been described in detail, many modifications and variations thereto are possible all of which fall within the true spirit and scope of the invention. For example, while a particular design for an eight cylinder engine is given, designs for engines having four, six, or some other number of cylinders are all contemplated by the subject invention.

I claim:

1. A system for controlling the ignition dwell of an internal combustion engine comprising
    an ignition pulse generating means, coupled to the engine, and producing output pulses suitable for ignition firing,
    a position pulse generating means coupled to the engine and producing output pulses at a rate representative of the magnitude of engine RPM,
    a first circuit means for processing the position pulses and producing an output signal representative of engine position, the first means resettable to an initial state prior to the occurrence of the first position pulse following a trigger pulse,
    a second circuit means, having an approximate hyperbolic transfer characteristic, for processing the position pulses and producing an output representative of engine RPM,
    a comparator means for comparing the first circuit means output with the second circuit means output and producing a trigger signal in response to a predetermined relationship between the two outputs, and
    switch means initiating dwell time in response to a trigger signal from the comparator means and firing the ignition in response to an ignition pulse.

2. The system of claim 1 wherein the position pulses are of a time duration inversely proportional to engine RPM, equidistantly spaced one to the next,
    and which are synchronously located between firing pulses such that the first position pulse is selected to represent maximum allowable dwell and the last position pulse is selected to represent minimum allowable dwell.

3. The system of claim 1 wherein the first circuit menas includes a staircase generating means.

4. The system of claim 1 wherein the second circuit means hyperbolic approximating circuit includes a resistance, a capacitance, a voltage source, and a switch, the product of resistance and capacitance of preselected value, the voltage source of preselected value, the switch operable from a short to an open mode in response to input position pulses, the capacitance and resistance series connected between terminals of the voltage source, and the switch connected across the capacitor whereby the signal produced across the capacitance approximates a scaled hyperbolic transfer of the position pulses.

5. The system of claim 1 wherein the comparator produces a trigger pulse when the output of the first circuit means exceeds the maximum value of the second circuit means.

6. The system of claim 1 wherein the comparator means comprises means extending the position pulse by a predetermined interval, and the switch means includes a gate operable to initiate dwell time only during the extended interval.

7. The system of claim 1 wherein the predetermined relationship between the first output and the second output corresponds to a predetermined constant dwell time for a given range of engine RPM, whereby the ignition coil is charged to a substantially constant energy level over the given range.

8. The system of claim 7 wherein the given range is 375–3000 RPM.

9. In the ignition system for an internal combustion engine
    means for controlling ignition dwell including
    a first generating means, coupled to the engine, producing a signal suitable for firing the ignition,
    a second generating means synchronized to generate a fixed number of pulses in the interval between the firing signals, each pulse having a time duration inversely proportional to engine RPM,
    a first circuit means processing the pulses and producing an analog voltage whose instantaneous value is representative of the instantaneous angle of engine rotation, the analog output resettable to an initial value in response to a subsequent firing signal, a second circuit means processing the pulses through a hyperbolic transfer approximating means and producing an output signal whose peak is representative of engine RPM, a comparator means producing a trigger output in response to a predetermined relationship between the first circuit means output and the second circuit means output, a switch means instituting dwell time in response to a trigger output from the comparator and firing the ignition in response to a fire signal.

10. The ignition system of claim 9 wherein the hyperbolic transfer approximating means includes a resistance, a capacitance, a voltage source and a switch, the resistor and capacitor series connected between the terminals of the voltage source, the switch connected across the terminals of the capacitor, the product of capacitance and resistance of preselected value, the output of the voltage source of preselected value, the switch operable to allow capacitance charging during pulse times, the switch otherwise discharging the capacitor, whereby the output taken across the capacitor approximates the inverse of the time duration of the pulses.

* * * * *